United States Patent

[11] 3,602,804

[72] Inventor Ronald H. Randall
Cuba, N.Y.
[21] Appl. No. 883,139
[22] Filed Dec. 8, 1969
[45] Patented Aug. 31, 1971
[73] Assignee Acme Electric Corporation
Cuba, N.Y.

[54] REGULATOR CIRCUIT RESPONSIVE TO INPUT VOLTAGE, OUTPUT VOLTAGE AND CURRENT
16 Claims, 1 Drawing Fig.

[52] U.S. Cl. .................................................. 323/20,
321/18, 323/22 SC, 323/40
[51] Int. Cl. ...................................................... G05f 1/64,
G05f 5/00
[50] Field of Search .......................................... 321/16–18;
323/4, 9, 16–22, 22 SC, 22 T, 20, 40, 22 R

[56] References Cited
UNITED STATES PATENTS
3,303,411 2/1967 Gately ........................... 323/4
3,323,034 5/1967 Lubin ........................... 321/16
3,470,457 9/1969 Howlett ........................ 323/22 (T)

OTHER REFERENCES
KEPCO Power Supply Handbook; Pages 31– 34 Relied Upon; 1966 Publication— 2nd Printing; copy in Scientific Library TK 451 K4B5 C.7.

Primary Examiner—Gerald Goldberg
Attorney—Woodling, Krost, Granger and Rust

ABSTRACT: Operational amplifiers are used in a regulator circuit for a DC output voltage. A rectifier supplies a voltage to output leads and three loops are provided, an input voltage loop, an output voltage loop, and a current limit loop. Each loop compares a reference voltage with a feedback voltage to develop an error signal and these are all combined and multiplied in operational amplifiers to maintain constant load voltage despite input voltage fluctuations and output or load voltage fluctuations and also to limit the current upon reaching a present value.

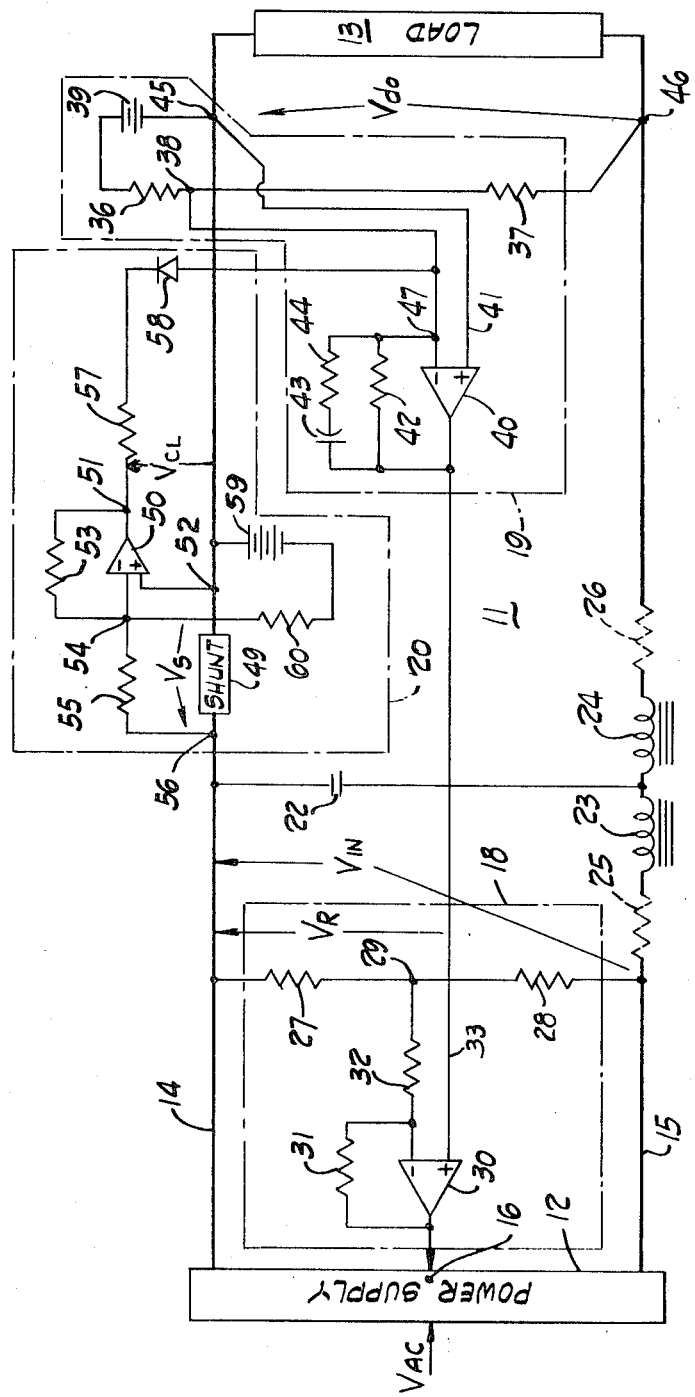

REGULATOR CIRCUIT RESPONSIVE TO INPUT VOLTAGE, OUTPUT VOLTAGE AND CURRENT

BACKGROUND OF THE INVENTION

Regulator circuits have been many and varied for regulating voltage or current. In many cases the regulation is less than desired because the comparison of a reference voltage with a feedback voltage to develop an error signal is not sufficiently amplified to give good control and hence good regulation. Five percent regulation from zero load to full load is quite common in many regulator circuits and this means that the voltage may fall off to 95 percent of rated value of full load current. Also in regulator circuits for a rectified voltage, where ripple is present, a filter is often used to remove the ripple. These are brute force filters with large values of capacitive reactance and the time constant is necessarily appreciable in order to effectively remove the ripple which might be in the order of 60 to 360 Hz. for 60 Hz. supply voltages. The time constant of the filter produces a time lag which makes it impossible to closely regulate out the input voltage variations when the feedback is sensing a voltage on the load side of the filter. Conversely, if the voltage feedback is on the rectifier or input side of the filter, then it is relatively insensitive to rapid load changes.

Current limit circuits have been used but in general they have a rather insensitive area at which the current limiting commences. In order to have current limiting fully effective at a rated current, most current limit circuits actually begin partial current limiting at a value, e.g., of 90 percent rated current and thus there is not a sharp knee in the load current curve.

Accordingly an object of the invention is to provide a regulator circuit which obviates the above-mentioned disadvantages.

Another object of the invention is to provide a regulator circuit using operational amplifiers for exceptionally high gain to achieve a very small percentage regulation of the voltage.

Another object of the invention is to provide a regulator circuit sensitive to input voltage as well as to output voltage on the opposite side of a filter to regulate load voltage in accordance with each the input and output voltages.

Another object of the invention is to provide a current limit circuit for abrupt current limit protection with a high gain in the current limit circuit to insure proper protection of the regulator circuit without affecting the output voltage regulation for currents close to the limiting value.

Another object of the invention is to provide a regulator circuit removing input voltage transients.

Another object of the invention is to provide a regulator circuit having remote sensing of the actual load voltage to remove voltage regulation due to internal lead drop.

Another object of the invention is to provide a linearization of the output voltage loop by supplying a signal from the output voltage loop through an input voltage loop.

SUMMARY OF THE INVENTION

The invention may be incorporated in a regulator circuit for a controllable power supply having an output voltage on output leads for connection to a load, first means connected to said output leads developing a first voltage signal, reference voltage means, means comparing said reference voltage means with said first voltage signal to develop a first error signal, and amplifier means connected responsive to said error signal and connected to control the power supply to regulate the voltage to the output leads.

BRIEF DESCRIPTION OF THE DRAWING

The single FIGURE of the drawing is a schematic diagram of a regulator circuit incorporating the invention.

DESCRIPTION OF THE PREFERRED EMBODIMENT

The drawing shows a regulator circuit 11 to regulate the voltage of a power supply 12 as supplied to a load 13. Output leads 14 and 15 supply the voltage from the power supply 12 to the load 13. The power supply 12 may be any controllable power supply controlled by a variable voltage on a terminal 16, for example, it may be a phase shiftable rectifier supplied with an alternating voltage $V_{AC}$ to control a DC voltage supplied on the output leads 14 and 15. In this example lead 14 is a positive relative to lead 15. The load 13 may be a DC load of most any description such as a battery being charged or a computer or other DC load wherein the value of the voltage thereto is desired to be regulated.

In general the regulator circuit 11 includes an input voltage loop circuit 18, an output voltage loop circuit 19, and a current limit loop circuit 20. An L-C or T-filter is provided including a capacitor 22 connected across the leads 14 and 15, plus inductors 23 and 24 in series in the lead 15. Resistors 25 and 26 represent the inherent resistance in the inductors 23 and 24 or alternatively may actually be physical resistors. The input voltage loop circuit 18 is on the power supply end of the leads 14 and 15 and the output voltage loop 19 is on the load end or distal end of these leads 14 and 15, with the L-C filter 22–24 in between these two loops 18 and 19.

A first voltage divider is connected across the power supply end of the leads 14 and 15 and is formed by resistors 27 and 28 connected in series at a tapoff connection 29. A first operational amplifier 30 is connected with an output to the control terminal 16 and with negative and positive input terminals. A feedback resistor 31 is connected around the operational amplifier 30 from the negative input to the output thereof. An input resistor 32 is connected between the negative input of operational amplifier 30 and the tapoff connection 29. A conductor 33 is connected to the positive input of the operational amplifier 30.

The output voltage loop circuit 19 includes a resistive voltage divider formed by resistors 36 and 37 connected in series with a tapoff connection 38 therebetween. A reference voltage source 39 is connected between the resistor 36 and the output lead 14, which may be the positive output lead of the power supply 12. A second operational amplifier 40 has an output connected to the conductor 33 and has negative and positive inputs with the positive input connected by conductor 41 to the positive lead 14. A feedback resistor 42 is connected around the operational amplifier 40 from the output 33 to the negative input terminal 47 which is also connected to the voltage divider tap 38. Optionally a capacitor 43 and resistor 44 may be connected in series and this series combination in parallel with the feedback resistor 42. The series combination of the reference voltage source 39 and the voltage divider 36, 37 is connected directly across the output ends of output leads 14 and 15, and preferably across the output terminals 45 and 46 at the distal ends of the output leads 14 and 15. These terminals 45 and 46 may be considered the actual load terminals of the load 13. The conductor 41 interconnects the positive input of operational amplifier 40 and the actual load terminal 45.

The current limit loop circuit 20 includes generally a current responsive means or resistive shunt 49. A third operational amplifier 50 has an output at a terminal 51 and has negative and positive input terminals. The positive input terminal is connected to the load end or negative terminal 52 of the shunt 49. A feedback resistor 53 is connected around the third operational amplifier 50 from the output terminal 51 to the negative input terminal 54 of this amplifier 50. An input resistor 55 is connected from this negative input terminal 54 to the positive terminal 56 of the shunt 49. The output from the operational amplifier 50 is fed through a resistor 57 and to the cathode of a diode 58 and through this diode to the negative input terminal 47 of the second operational amplifier 40. A voltage reference source 59 may be considered a source of a reference signal and has the positive terminal connected to the negative shunt terminal 52. The negative end of this source 59 is connected through an input resistor 60 to the negative input terminal 54 of the operational amplifier 50.

OPERATION

The regulator circuit 11 includes a three operational amplifiers, 30, 40, 50 and each operational amplifier is a high voltage gain inverting amplifier. By this it is meant that positive input signals produce a negative output and vice-versa. These are for inputs applied to the negative input terminal of each operational amplifier. Without feedback the output of the amplifier is the amplification factor times the input voltage to that particular amplifier. The input impedance of each operational amplifier is extremely high such that the input current may be considered to be zero and therefore with feedback resistors incorporated as shown in the drawing, the output voltage of a particular operational amplifier is proportional to and approximately equal to the input voltage times the ratio of the feedback resistor to the input resistor. In one practical circuit made according to the invention, the ratio of feedback to input resistor was 100:1. With reference to the input voltage loop 18 the output voltage of the operational amplifier 30 is called $V_c$ and appears between the output lead 14 and the control terminal 16. A voltage $V_{R27}$ appears across the resistor 27 and a voltage $V_R$ appears between output lead 14 and the conductor 33. A voltage $V_{in}$ appears between the power supply end of the output leads 14 and 15. With these voltages, the output voltage $V_c$ from the operational amplifier 30 will be proportional to:

$$V_c = (-R31/R32)(V_R - V_{R27}) \quad (1)$$

The above formula shows that the output voltage for the operational amplifier 30 is dependent on a negative because it is an inverting amplifier, it is dependent on the ratio of the feedback to input resistors and it is dependent upon the input voltage which in this case is $V_R - V_{R27}$. Additionally the plus input terminal at conductor 33 is displaced from ground in this case, the output lead 14, and hence the actual output voltage is:

$$V_c = (V_R - V_{R27})(-R31/R32) - V_R \quad (2)$$

If $V_{R27}$ becomes greater than $V_R$ then $V_c$ becomes less negative or increases positively. The power supply 12 is controllable such as a phase controlled thyristor rectifier and this may be a three phase system operating from a 60 Hz. supply voltage and consequently will have a 360 Hz. ripple on the output leads 14 and 15. In one particular regulator circuit made according to the present invention, the power supply was a phase controlled thyristor rectifier wherein increasing magnitude of voltage between the output lead 14 and the control terminal 16, decreased the output voltage on the leads 14 and 15. Thus this control voltage is inverting. $V_{R27}$ is a direct proportion or fraction of $V_{in}$ because of the voltage divider 27, 28. Thus it will be seen that:

$$V_{in} = (R_{27} + R_{28}/R27)V_R \quad (3)$$

Notice that changes in the incoming power supply voltage $V_{AC}$ will be regulated out such that $V_{in}$ is a function of $V_R$ rather than $V_{AC}$. In this circuit $V_R$ is a reference voltage or reference signal against which changes in the input voltage $V_{in}$, or a fraction thereof dependent on $R27$, is compared and with this comparison an error signal is developed and supplied as an input to the first operational amplifier 30. For the purposes of this input voltage loop circuit 18, it may be considered that the voltage $V_R$ on the conductor 33 is a constant or substantially constant voltage against which this varying voltage $V_{R27}$ is compared.

The output voltage loop circuit 19 includes the circuit elements shown in the drawing and may also be considered as including the L-C or T-filter 22, 23, and 24. The operational amplifier 40 is connected to amplify an error signal and in its circuit connection acts as a comparator comparing a reference voltage from the source 39 with a certain fraction of the output voltage $V_{do}$ which is the load voltage or the voltage across the terminals 45 and 46. In one practical circuit in accordance with the invention, the regulator circuit 11 may be one supplying a regulated voltage of 50 volts to the load 13 at a maximum amperage of 400 amperes. Merely by way of example the reference voltage 39 may be 10 volts. Because this source is connected in opposition to the voltage across the terminals 14 and 15, this means that a total of 60 volts is nominally impressed across the voltage divider resistors 36 and 37. By way of example there may be about 10 volts across resistor 36 and about 50 volts across resistor 37, and thus terminal 38 may be essentially at the potential of lead 14. The voltage divider 36, 37 takes a certain fraction of the output voltage $V_{do}$ and the reference voltage 39 is compared with this fraction to provide an error signal or weighted difference proportional to the load voltage. This error signal is passed to and amplified by the second operational amplifier 40. The capacitor 43 and resistor 44 form a gain rolloff network such that the loop gain is less than unity for frequencies approaching the resonant frequency of the T-filter 22-24. This resonant frequency might be in the order of 30 Hz. where it is designed to minimize the 360 Hz. ripple on the output leads 14 and 15. This gain rolloff network is used in order to insure that the output voltage loop 19 does not oscillate. The output voltage of the second operational amplifier 40 is the voltage $V_R$, thus $V_R$ is described by the following equation for DC gain:

$$V_R = V_{do}(R42/R37) - V_{39}(R42/R36) \quad (4)$$

The above is because the operational amplifier 40 may be considered as having two separate inputs one through R36 and the reference voltage $V_{39}$ and the other through resistor 37 and the load voltage $V_{do}$. Simplifying this formula we have:

$$V_R = (R42/R36 \ R37)(V_{do}R36 - V_{39}R37) \quad (5)$$

If $R36$ should equal $R37$ then the equation becomes simply:

$$V_R = (-R42/R37)(V_{39} - V_{do}) \quad (6)$$

Notice that if $V_{39}$, the reference voltage is greater than $V_{do}$, then as $V_{do}$ decreases $V_R$ is increased negatively. As shown above for the input voltage loop increasing $V_R$ will increase the $V_{in}$ across the output leads 14 and 15. Thus increasing $V_{in}$ increases $V_{do}$. $V_{do}$ is therefore regulated by the loop gain such that $$V_{do} = (R37/R36)V_{39} \quad (7)$$

Resistors 25 and 26 represent the inherent resistance of the inductors 23 and 24, respectively. The voltage drops across these series resistances will be regulated out by the output voltage loop 19 thus the output voltage loop produces a regulated output voltage that is not a function of load current.

The current limit loop circuit 20 includes the operational amplifier 50 having two different inputs one from the shunt 49 and one from the reference signal 59. These two inputs are connected in parallel and are actually connected in voltage opposition. The positive shunt terminal 56 is that which is connected through the input resistor 55 to the negative operational amplifier input terminal 54. The negative terminal of the reference signal 59 is that which is connected through the input resistor 60 to the negative input terminal 54 of this operational amplifier 50. Accordingly the reference signal 59 is compared with the voltage $V_s$ developed across the shunt 49 and the algebraic sum of these two input signals is that which is effectively applied to the input terminals of the operational amplifier 50. It is applied as a third error signal and is amplified by this operational amplifier 50. The output of the amplifier 50 is a voltage $V_{cl}$, the current limiting signal such that:

$$V_{cl} = V_{59}(R53/R60) - V_s(R53/R55) \quad (8)$$

If $V_s R53/R55$ is greater than $V_{59} R53/R60$, then $V_{cl}$ becomes negative. Only negative signals are passed by the reversely connected diode 58 to the negative input terminal 47 of the second operational amplifier 40, and this reduces the output voltage $V_{do}$. If $V_s R53/R55$ is less than $V_{59} R53/R60$, then diode 58 blocks this reverse current which would tend to increase the DC output voltage $V_{do}$. The current limit loop circuit 20 decreases the output voltage to limit the output current to less than or equal to rated current set by the reference voltage $V_{59}$.

It will be noted that each of the three loops compares some feedback or signal voltage with a reference signal to provide an error signal which is amplified by operational amplifier means 30, 40 and 50. In the case of the input and output voltage loops 18 and 19 resistive voltage dividers are provided to obtain a fraction of the voltage under consideration and it is this fraction which is compared with a reference voltage to provide an error signal. The reference voltage for the output voltage loop 19 is supplied by the reference source 39 and the reference voltage for the current limit loop 20 is supplied by the reference source 59. However in the input voltage loop 19 the reference voltage against which $V_{R27}$ is compared is not directly supplied by a reference voltage source, instead it is the output $V_R$ from the second operational amplifier 40. All three error signals are applied to the control voltage terminal 16 and in this preferred embodiment are connected in cascade with the signal from the third operational amplifier 50 providing an input to the second operational amplifier 40 in turn providing an input to the first operational amplifier 30.

The above circuit has several advantages one of which is removal of input transients on $V_{ac}$ the input alternating voltage to the power supply 12. As shown by formula (3), the changes in $V_{ac}$ will not show up on $V_{in}$ because $V_{in}$ is a function only of the voltage $V_R$ and the ratio of the resistors in the voltage divider. This mathematically demonstrates that all input transients are removed. Without this input voltage loop 18, it would be impossible to remove the changes in $V_{ac}$ because of the time lag in the T-filter 22, 23 and 24. Because this is a brute force filter it will have large capacitive and inductive reactance which will have a large time constant. Despite how large this time constant might be the input voltage loop 18 effectively removes any transients in the input voltage $V_{ac}$.

Remote sensing of the actual load voltage is provided by having the control leads to this output voltage loop 19 connected directly to the load terminals 45 and 46. In an actual circuit these may be small control wires leading directly to the load terminals and the output leads 14 and 15 may be heavy cables or bus bars to convey this large current in the order of 400 amperes, for example.

A third advantage of regulator circuit 11 is the linearization of the output voltage loop. If the input power supply 12 has an output voltage which is not a linear function of the control voltage $V_c$, the input voltage loop 18 will linearize this function in the output loop; that is, the input power control element for the output voltage loop 19 now becomes $V_R$ which is linear with respect to $V_{in}$. Linearization of this function enables stabilization of the output loop 10 with higher gain since the gain of $V_{in}/V_R$ is relatively constant.

A fourth advantage of this regulator circuit is abrupt current limit protection. The gain of the current limit loop circuit 20 may be made large enough to insure protection without affecting the output voltage regulation for currents close to the limiting value. It will be noted from formula (8) that the diode 58 blocks any reverse current until the voltage from the shunt 49 exceeds the voltage from the reference 59. Thus there is a sharp knee to the load current curve and this load current curve does not begin to taper off at about 90 percent of the limiting value as is found in many prior art current limiting circuits. Thus if the circuit 11 is operating at about 90 percent of full load current there is still proper regulation of the load voltage because the diode 58 completely blocks any current from the operational amplifier 50. Yet as soon as the rated current is exceeded, the operational amplifier 50 has a definite and large output to immediately decrease the voltage to the output leads 14 and 15 and hence decrease the current to the load 13.

The term operational amplifier has been used for the amplifiers 30, 40 and 50. Amplifier 30 in the circuit as described in this preferred embodiment is an operational amplifier because it performs a mathematical operation; namely, it inverts and also it performs a subtraction function of amplifying the error signal which is a difference voltage between $V_R$ and $V_{R27}$. The amplifier 40 also performs the mathematical operation of inverting and the mathematical operation of subtraction; namely, it subtracts the load voltage $V_{do}$ from the reference voltage $V_{39}$, see equation (6). The amplifier 50 is termed an operational amplifier because it again performs an inverting function and it also performs a subtraction function of subtracting the signal across the shunt 49 from the reference voltage 59 to provide an error signal.

All three amplifiers 30, 40 and 50 are also high gain amplifiers wherein the open circuit gain is considerably higher than the gain as connected in circuit which is dependent upon the ratio of feedback resistor to the input resistor. Accordingly in the circuit in which these amplifiers are connected, the function of these amplifiers is independent of the actual open circuit gain of these amplifiers.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the e spirit and scope of invention as hereinafter claimed.

What is claimed is:

1. A regulator circuit for a controllable power supply having an output voltage with an AC component on output leads for connection to a load,
   amplifier means including first and second amplifiers,
   a filter connected across said output leads to filter the AC component,
   first means connected to said output leads on the power supply side of said filter and developing a first voltage signal,
   reference voltage means,
   means comparing said reference voltage means with said first voltage signal to develop a first error signal,
   means connecting said first amplifier responsive to said first error signal and connected to control the power supply to regulate the voltage to the output leads,
   second means connected across said output leads on the load side of said filter and developing an output voltage signal,
   means comparing said reference voltage means with said output voltage signal to develop a second error signal,
   and means connecting said second amplifier responsive to said second error signal and connected to control the power supply.

2. A regulator circuit as set forth in claim 1, including means connecting the output of said second amplifier to an input of said first amplifier.

3. A regulator circuit as set forth in claim 1, including current responsive means connected in one of said output leads,
   means comparing said reference voltage means with said current responsive means to develop a third error signal dependent on the current in said one of said output leads,
   and means connecting said amplifier means to be responsive to said third error signal and connected to control the power supply.

4. A regulator circuit as set forth in claim 3, including a third amplifier in said amplifier means,
   and means connecting said third amplifier responsive to said third error signal.

5. A regulator circuit as set forth in claim 4, including means connecting the output of said third amplifier to an input of said first amplifier.

6. A regulator circuit as set forth in claim 4, including means connecting the output of said second amplifier to an input of said first amplifier.

7. A regulator circuit as set forth in claim 4, including means connecting the output of said third amplifier to an input of said second amplifier.

8. A regulator circuit as set forth in claim 1, including a current signal amplifier,
   a resistive shunt connected in one of said output leads,
   a reference signal, means connecting said current signal amplifier in circuit with said resistive shunt and said reference signal to establish current limiting upon the voltage across said shunt exceeding the voltage of said reference signal, and means connecting the output of said current signal amplifier to an input of said second amplifier to control the output current in said output leads.

9. A regulator circuit as set forth in claim 8, wherein said output voltage is rectified from an alternating current, and said filter including an L-C filter connected in said output leads between said shunt and said first means developing a first voltage signal.

10. A regulator circuit as set forth in claim 1, wherein said second means developing an output voltage signal is a second resistive voltage divider having an output tap, a feedback resistor connected around said second amplifier, and means connecting said output tap to an input of said second amplifier.

11. A regulator circuit as set forth in claim 1, wherein said second means developing a second voltage signal includes a second resistive voltage divider, a first reference voltage in said reference voltage means, and means connecting said second voltage divider and first reference voltage in series across said output leads with said reference voltage in opposition to the voltage across said output leads.

12. A dual loop voltage regulator and current limit circuit, comprising in combination, a controllable rectifier operable from an alternating current input and having a DC output voltage on output leads, an input voltage control loop, an output voltage control loop, and a current limit control loop, said input voltage control loop including a first resistive voltage divider across said output leads and having a first tapoff connection, a feedback resistor and an input resistor, an operational amplifier connected in circuit with said feedback and input resistors as a multiplier and connected to said first tapoff connection of said voltage divider to multiply any error signal in the voltage on said rectifier output terminals, means connecting the output of said multiplier operational amplifier to control said controlled rectifier to maintain the voltage to the output leads of the rectifier substantially constant, an L-C filter connected in said output leads, a resistive shunt connected in said output leads as a part of said current limit control loop, output terminals on the distal ends of said output leads, said output voltage control loop having a second resistive voltage divider and a first reference voltage connected in series across the output terminals of said output leads, said second resistive voltage divider having an output tap, a second operational amplifier, a second feedback resistor connected around said second operational amplifier, means to connect said second operational amplifier to said output tap of said second resistive voltage divider, means connecting the output of said second operational amplifier to an input of said first operational amplifier, said current limit control loop including a second voltage reference connected to the positive output terminal of said output leads, a third operational amplifier having a feedback resistor connected thereacross and connected through a first input resistor to said second voltage reference to establish a current limit threshold, a second input resistor to said third operational amplifier connected to the positive input terminal of said shunt resistor to coact with the feedback resistor across said third operational amplifier to establish current limiting upon the voltage across said shunt exceeding the voltage of said second reference voltage, and means connecting the output of said third operational amplifier to an input of said second operational amplifier to control the output current in said output leads.

13. A regulator circuit for a controllable power supply having an output voltage on output leads for connection to a load, a first operational amplifier, first means connected to said output leads developing a first voltage signal, reference voltage means, means comparing said reference voltage means with said first voltage signal to develop an error signal applied to said operational amplifier, means connecting the output of said first operational amplifier to control the power supply to regulate the voltage to the output leads, a current signal operational amplifier, current responsive means connected in one of said output leads, a reference signal, means connecting said current signal operational amplifier in circuit with said current responsive means and said reference signal to establish current limiting upon the voltage across said current responsive means exceeding the voltage of said reference signal, and means connecting the output of said current signal operational amplifier to an input of said first operational amplifier to control the output current in said output leads.

14. A regulator circuit as set forth in claim 13, wherein said current signal operational amplifier has an input including a resistive shunt as said current responsive means and an input resistor in series, a feedback resistor connected around said current signal operational amplifier to cooperate with said input, a diode connected in the output circuit of said current signal operational amplifier, whereby upon the voltage signal from said resistive shunt becoming greater than that from said reference signal, the polarity of the total input to said current signal operational amplifier reverses and is passed by said diode to establish the current limit threshold and establishes limiting of the current carried in said output leads.

15. A regulator circuit as set forth in claim 13, wherein said current signal operational amplifier has an input including said reference signal and an input resistor in series, a feedback resistor connected around said current signal operational amplifier to cooperate with said input, a diode connected in the output circuit of said current signal operational amplifier with a polarity to prevent conduction through the operational amplifier from said reference signal, said reference signal having a polarity opposite to that from said current responsive means to normally establish said current signal operational amplifier in a nonconducting condition, whereby upon the voltage signal from said resistive current responsive means becoming greater than that from said reference signal, the polarity of the total input to said current signal operational amplifier reverses and is passed by said diode to establish the current limit threshold and establishes limiting of the current carried in said output leads.

16. A regulator circuit as set forth in claim 13, wherein said current signal operational amplifier has two inputs in parallel, one input being a resistive shunt as said current responsive means and an input resistor in series, the other input being said reference signal and another input resistor in series, a feedback resistor connected around said current signal operational amplifier to cooperate with each of the two inputs, a diode connected in the output circuit of said current signal operational amplifier with a polarity to prevent conduction through the operational amplifier from said reference signal, said reference signal having a polarity opposite to that of said shunt to normally establish said current signal operational amplifier in a nonconducting condition,
whereby upon the voltage signal from said resistive shunt becoming greater than that from said reference signal, the polarity of the total input to said current signal operational amplifier reverses and is passed by said diode to establish the current limit threshold and establishes limiting of the current carried in said output leads.